US008644175B2

(12) United States Patent
Sumasu et al.

(10) Patent No.: US 8,644,175 B2
(45) Date of Patent: Feb. 4, 2014

(54) RADIO COMMUNICATION SYSTEM, SCHEDULING METHOD, RADIO BASE STATION DEVICE, AND RADIO TERMINAL

(75) Inventors: Atsushi Sumasu, Kanagawa (JP); Katsuhiko Hiramatsu, Leuven (BG)

(73) Assignee: Panasonic Corporation, Osaka (JP)

( * ) Notice: Subject to any disclaimer, the term of this patent is extended or adjusted under 35 U.S.C. 154(b) by 589 days.

(21) Appl. No.: 12/673,071

(22) PCT Filed: Aug. 13, 2008

(86) PCT No.: PCT/JP2008/002211
§ 371 (c)(1),
(2), (4) Date: Feb. 11, 2010

(87) PCT Pub. No.: WO2009/022473
PCT Pub. Date: Feb. 19, 2009

(65) Prior Publication Data
US 2011/0273997 A1    Nov. 10, 2011

(30) Foreign Application Priority Data

Aug. 14, 2007   (JP) ................................ 2007-211541

(51) Int. Cl.
*H04W 24/00*   (2009.01)
(52) U.S. Cl.
USPC ........... 370/252; 370/265; 375/144; 375/148; 375/346; 455/67.13; 455/500
(58) Field of Classification Search
USPC ......... 370/252, 201, 268–269, 286, 289, 328; 455/67.13, 69, 450, 522, 500–506; 379/406.01–406.16; 375/144, 148, 375/254, 346, E1.029, E1.03, E1.031, 340, 375/260
See application file for complete search history.

(56) References Cited

U.S. PATENT DOCUMENTS 5,787,112 A * 7/1998 Murai ........................... 375/148
7,860,047 B2 * 12/2010 Urushihara et al. .......... 370/328
(Continued)

FOREIGN PATENT DOCUMENTS

| JP | 08-223106 | 8/1996 |
| JP | 10-023499 | 1/1998 |
| JP | 2006-197416 | 7/2006 |

OTHER PUBLICATIONS

International Search Report dated Nov. 11, 2008.
(Continued)

*Primary Examiner* — Michael Thier
*Assistant Examiner* — Vincelas Louis
(74) *Attorney, Agent, or Firm* — Dickinson Wright PLLC

(57) ABSTRACT

A radio communication system, scheduling method, radio base station device, and radio communication terminal all enabling improvement of the system throughput. The radio base station device (400) comprises a signal demultiplexing section (420), an interference/noise power measuring section (425), and scheduler section (430). The signal demultiplexing section (420) acquires information representing the net reception power of the signal which is transmitted from a mobile terminal and from which the influences of the interference and the noise power are removed. The interference/noise power measuring section (425) measures the interference and noise power components of the uplink. The scheduler section (430) carries out uplink band allocation and MCS selection according to the information representing the net reception power and the uplink interference and noise power components. On the basis of the net reception power and the uplink interference and noise power components, the uplink communication environment can be accurately grasped, and the uplink band allocation can be carried out according to these parameters. Hence, since the uplink scheduling can be precisely carried out, the system throughput can be improved.

13 Claims, 14 Drawing Sheets

(56) References Cited

U.S. PATENT DOCUMENTS

| | | | |
|---|---|---|---|
| 2003/0083092 A1* | 5/2003 | Kim et al. | 455/522 |
| 2005/0282500 A1* | 12/2005 | Wang et al. | 455/67.13 |
| 2006/0093074 A1* | 5/2006 | Chang et al. | 375/340 |
| 2006/0105719 A1* | 5/2006 | Itoh et al. | 455/69 |
| 2006/0148411 A1* | 7/2006 | Cho et al. | 455/67.13 |
| 2006/0178113 A1 | 8/2006 | Ishii | |
| 2007/0087772 A1* | 4/2007 | Yi et al. | 455/522 |
| 2007/0201568 A1* | 8/2007 | Bae et al. | 375/260 |
| 2008/0057969 A1* | 3/2008 | Agami et al. | 455/450 |

OTHER PUBLICATIONS

H. Obata, et al. "A Study on Reduction of CSI feedback for Frequency Domain Scheduling in OFDMA/TDD Systems," Technical Reports of IEICE, Apr. 2006, p. 1-6, p. 2, line 36.

3GPP TSG-RAN WG1 #44, "Uplink sounding for obtaining MIMO channel information at Node B in E-UTRA," Motorola, R1-060668, Feb. 2006, p. 1-6.

* cited by examiner

RADIO COMMUNICATION SYSTEM, SCHEDULING METHOD, RADIO BASE STATION DEVICE, AND RADIO TERMINAL

TECHNICAL FIELD

The present invention relates to a wireless communication system, scheduling method, radio base station apparatus and radio terminal apparatus. More particularly, the present invention relates to a wireless communication system to which a TDD scheme is applied, an uplink scheduling method used for this wireless communication system, radio base station apparatus and radio terminal apparatus.

BACKGROUND ART

In recent years, radio cellular systems represented by cellular phone sets or the like have diversified service modes and are required to transmit not only speech data but also large amounts of data such as still images and moving images.

While services of IMT-2000 cellular systems are already in progress, 3GPP LTE (3GPP Long Term Evolution) or the like requiring a peak rate of 100 Mbps in downlink is also being standardized. Now, standardization of IMT-Advanced is about to start as a category aiming for further evolution. This IMT-Advanced manifests requirements of about several Gbps as a rate with 100 MHz bandwidth in downlink and about several Mbps with 40 MHz in uplink, and requires a breakthrough far beyond IMT-2000.

Especially, frequency resource allocation or link adaptation matching frequency responses (i.e. quality/CQI (Channel Quality Indicator) for each frequency segmented within a band) is indispensable to make bands wider in both uplink and downlink and effectively use radio resources in such a circumstance. However, in case of FDD (Frequency Division Duplex) using different frequencies between uplink and downlink, frequency responses differ between an uplink band and a downlink band, and therefore both a radio base station apparatus (i.e. Node B) and mobile terminal apparatus (i.e. UE) need to transmit pilot signals or the like to measure a frequency response of each band.

Although transmitting data usually requires pilot signals for synchronized detection, the pilot signals for such a purpose only need to be transmitted in a band in which data is transmitted. However, pilot signals for quality measurement required for frequency resource allocation need to be transmitted in an entire band or in a band wider than the band in which data is transmitted, regardless of whether or not there is data.

On the other hand, in case of TDD (Time Division Duplex) which uses the same frequency in uplink and downlink, uplink and downlink have a high correlation in the channel characteristics (i.e. channel reciprocity). Therefore, a mobile terminal apparatus (i.e. UE) measures a frequency response (to be more specific, an SINR (Signal-to-Interference plus Noise Ratio) for each frequency band) using pilots transmitted by a radio base station apparatus (i.e. Node B) in downlink, the mobile terminal apparatus reports this frequency response (to be more specific, CQI (Channel Quality Indicator) for each frequency band) to the radio base station apparatus, so that the radio base station apparatus can learn frequency responses not only in downlink but also in uplink (see Patent Document 1 and Non-Patent Document 1). Therefore, the mobile terminal apparatus need not send pilot signals to measure quality in an entire band or wide band, to the radio base station apparatus. Therefore, TDD can reduce power consumption of the mobile terminal apparatus compared to FDD.

Furthermore, as described above, IMT-Advanced requires a wide band to realize high-speed transmission. Therefore, compared to IMT-2000, cases might occur in IMT-Advanced where widebands cannot be used in uplink and downlink individually depending on regions and circumstances of the operator. That is, when bands are made wider in both uplink and downlink, the importance of the TDD scheme which uses the same frequency in uplink and downlink is expected to increase more than ever.

Patent Document 1: Japanese Patent Application Laid-Open No. HEI8-223106

Non-Patent Document 1: "A Study on Reduction of CSI feedback for Frequency Domain Scheduling in OFDMA/TDD Systems", Haruka OBATA, Tadashi BABA, Seiich SAMBE, TECHNICAL REPORT OF IEICE, RCS2006-5, April 2006.

DISCLOSURE OF INVENTION

Problems to be Solved by the Invention

On the other hand, in a conventional wireless communication system to which a TDD scheme is applied, scheduling is performed assuming that there is reciprocity between uplink and downlink. However, as described above, according to the TDD scheme, while the channel characteristic have channel reciprocity between uplink and downlink, not all parameters indicating a communication environment have channel reciprocity between uplink and downlink. Thus, the conventional wireless communication system to which a TDD scheme is applied has a problem that scheduling using parameters exactly reflecting the communication environment is not performed and throughput of the entire system deteriorates.

It is therefore an object of the present invention to provide a wireless communication system, scheduling method, radio base station apparatus and radio terminal apparatus for improving system throughput.

Means for Solving the Problem

The scheduling method in an uplink according to the present invention in a wireless communication system to which a time division duplex scheme is applied to perform time division multiplexing on the uplink and a downlink, employs a configuration which includes: a step of measuring received power in the downlink; a step of measuring interference and noise power components in the downlink; a step of calculating net received power and calculating information indicating the net received power by removing the downlink interference and noise power components from the downlink received power; an interference and noise power component measuring step of measuring interference and noise power components in the uplink; and a band allocation step of allocating an uplink band based on the information indicating the net received power and the information indicating the uplink interference and noise power components.

The radio base station apparatus according to the present invention in a wireless communication system to which a time division duplex scheme is applied to perform time division multiplexing on an uplink and a downlink, employs a configuration which includes: a receiving section that receives information indicating received power in the downlink and information indicating interference and noise power components in the downlink; a measuring section that measures interference and noise power components in the uplink;

and a scheduler that calculates net received power removing the downlink interference and noise power components from the downlink received power, based on the information indicating the downlink received power and the information indicating the downlink interference and noise power components, and allocates uplink bands based on the net received power and the uplink interference and noise power components.

The radio terminal apparatus according to the present invention in a wireless communication system to which a time division duplex scheme is applied to perform time division multiplexing on an uplink and a downlink, employs a configuration which includes: an acquiring section that acquires net received power removing interference and noise power from received power upon receiving a pilot signal transmitted in the downlink; a determining section that determines information indicating the net received power based on the acquired net received power; and a transmitting section that transmits the information indicating the net received power.

The wireless communication system according to the present invention to which a time division duplex scheme is applied to perform time division multiplexing on an uplink and a downlink, employs a configuration which includes: a plurality of radio terminal apparatuses that each have: an acquiring section that acquires net received power removing interference and noise power from received power upon receiving a pilot signal transmitted in the downlink; a determining section that determines information indicating the net received power based on the acquired net received power; a calculating section that calculates the interference and noise power; and a transmitting section that transmits the information indicating the net received power and information indicating the interference and noise power, to a radio base station apparatus, and in which some radio terminal apparatuses belonging to each of groups into which the plurality of radio terminal apparatuses are grouped transmit only information indicating the net received power at each transmission timing.

Advantageous Effects of Invention

The present invention can provide a wireless communication system, scheduling method, radio base station apparatus and radio terminal apparatus for improving system throughput.

BEST MODE FOR CARRYING OUT THE INVENTION

Figure 1:
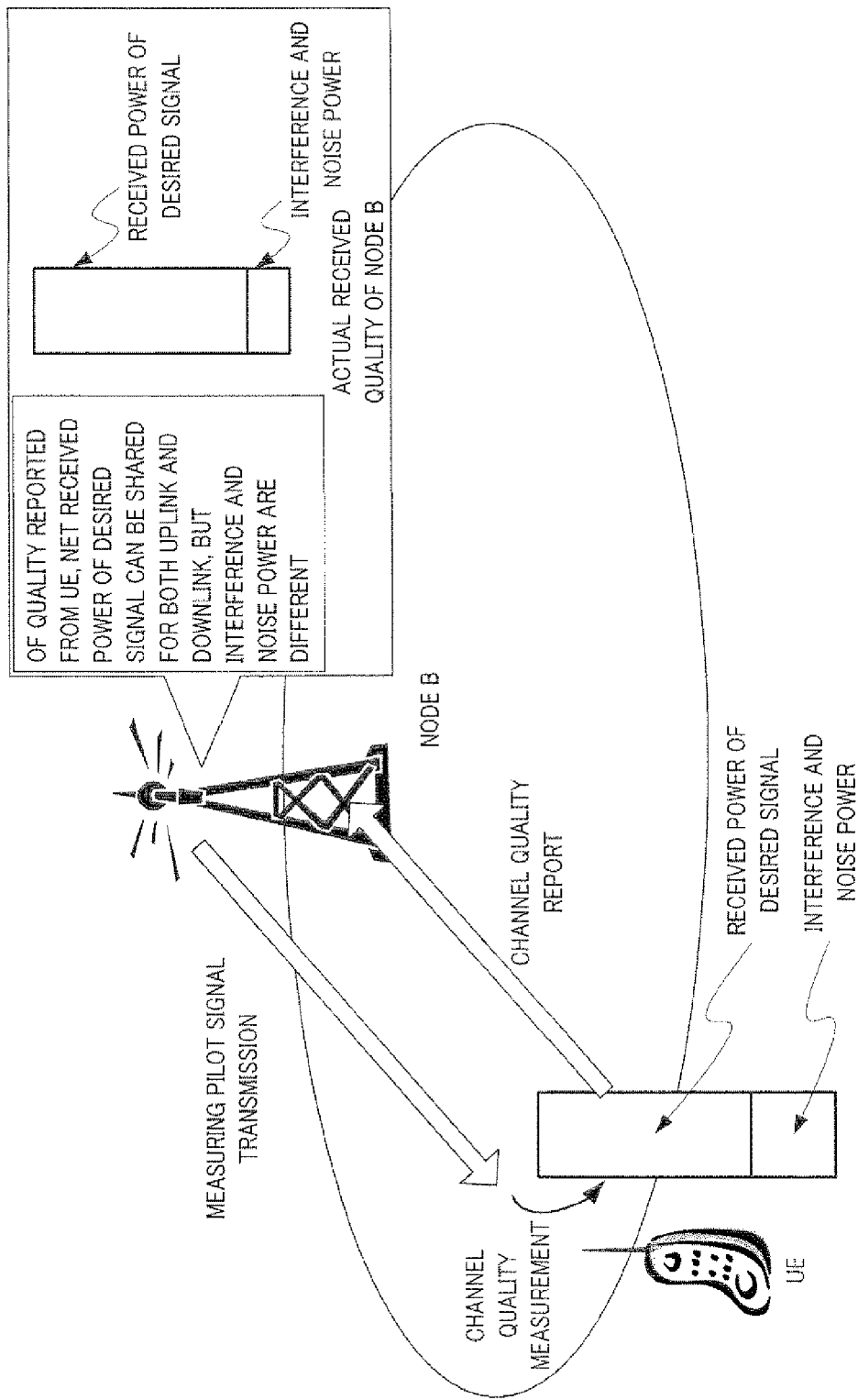
FIG. 1 illustrates a conventional wireless communication system to which a TDD scheme is applied.

In a wireless communication system to which a TDD scheme is applied as described above, as shown in FIG. 1, a radio base station apparatus (i.e. Node B) transmits a pilot signal first. A mobile terminal apparatus (i.e. UE) calculates an SINR using the pilot signal. Next, the mobile terminal apparatus determines CQI based on the calculated SINR, and reports the CQI to the radio base station apparatus.

The radio base station apparatus that has received the CQI report performs scheduling based on the CQI not only in downlink but also in uplink.

Here, the SINR calculated in the mobile terminal apparatus can be regarded as a ratio of received power of a desired signal transmitted in downlink to interference and noise power in downlink. The inventor of the present invention has discovered that interference and noise power is likely to significantly vary depending on the location of an entity that measures the interference and noise power. That is, the interference power is determined by a non-desired signal received by a receiver, and therefore interference power observed varies between the radio base station apparatus and the mobile terminal apparatus that are located in different positions from other radio base station apparatuses and mobile terminal apparatuses which transmit non-desired signals. Furthermore, noise power becomes power unique to the receiver according to performance (i.e. noise factor ("NF") or the like) and temperature of the radio section of the receiver, and therefore the observed noise power varies between the radio base station apparatus and the mobile terminal apparatus.

Furthermore, the inventor of the present invention came to think that it would be necessary to perform scheduling based on an SINR in uplink to accurately perform uplink scheduling.

Figure 2:
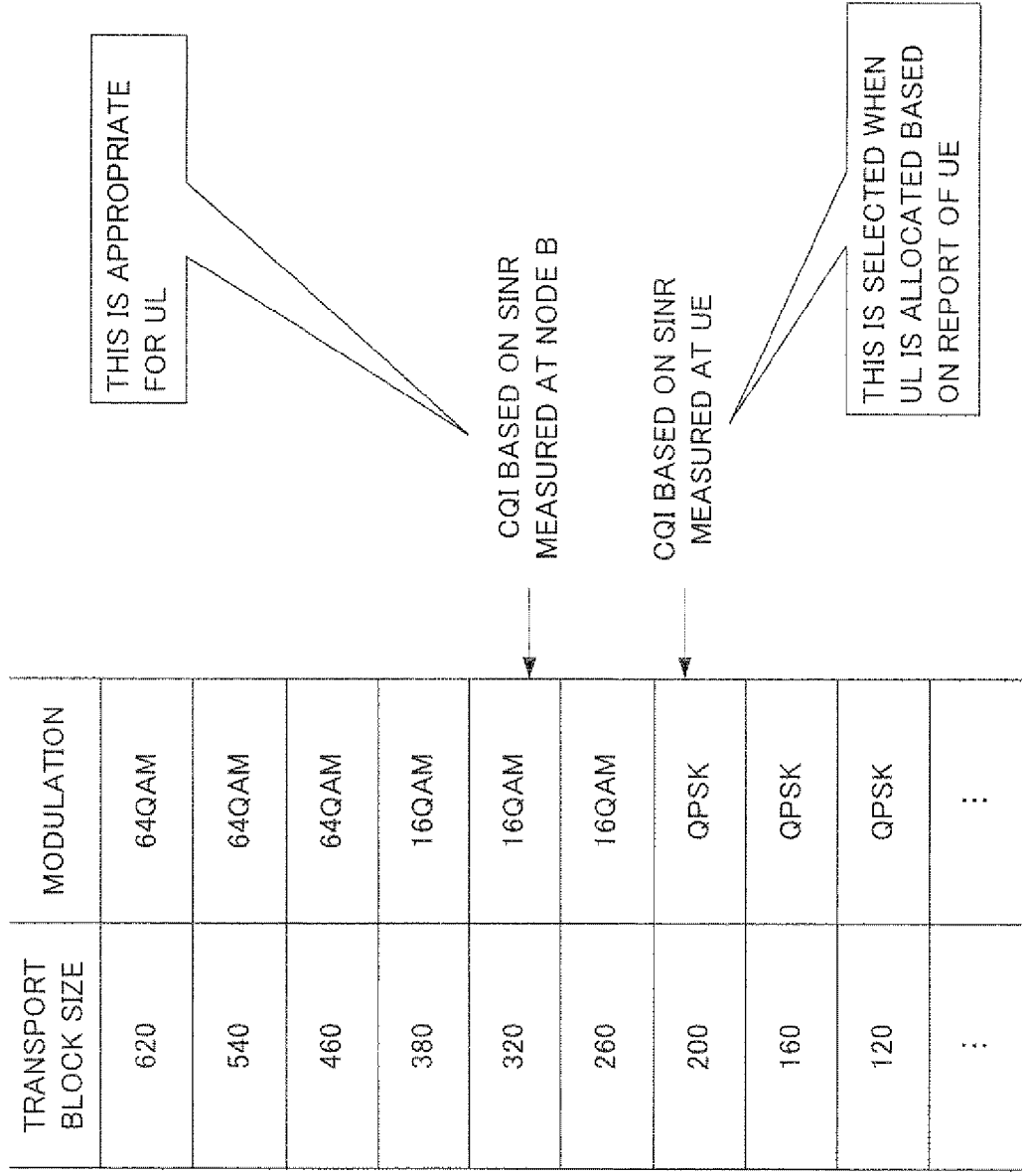
FIG. 2 illustrates scheduling in the wireless communication system in FIG. 1.

For example, when interference and noise power measured in the radio base station apparatus is smaller to some extent than interference and noise power measured in the mobile terminal apparatus, if uplink scheduling is performed based on the SINR measured in the mobile terminal apparatus, scheduling suitable for an environment stricter than the actual uplink communication environment is performed. To be more specific, as shown in FIG. 2, although communication is possible with a transmission block size of 320 and a modulation scheme of 16 QAM in the actual uplink communication environment, if scheduling is performed based on the SINR calculated in the mobile terminal apparatus, there may be a situation in which communication is only possible with a transmission block size of 200 and a modulation scheme of QPSK. In such a situation, system throughput deteriorates.

On the other hand, when the interference and noise power measured in the radio base station apparatus is greater to some extent than the interference and noise power measured in the mobile terminal apparatus, scheduling suitable for an environment better than the actual uplink communication environment is performed. As a result, the error rate or the like deteriorates, thereby deteriorating system throughput.

The inventor of the present invention has arrived at the present invention by discovering the above-described problem.

Hereinafter, embodiments of the present invention will be described in detail with reference to the accompanying drawings. Note that, with the embodiments, the same components will be assigned the same reference numerals and descriptions thereof will be omitted.

Embodiment 1

Figure 3:
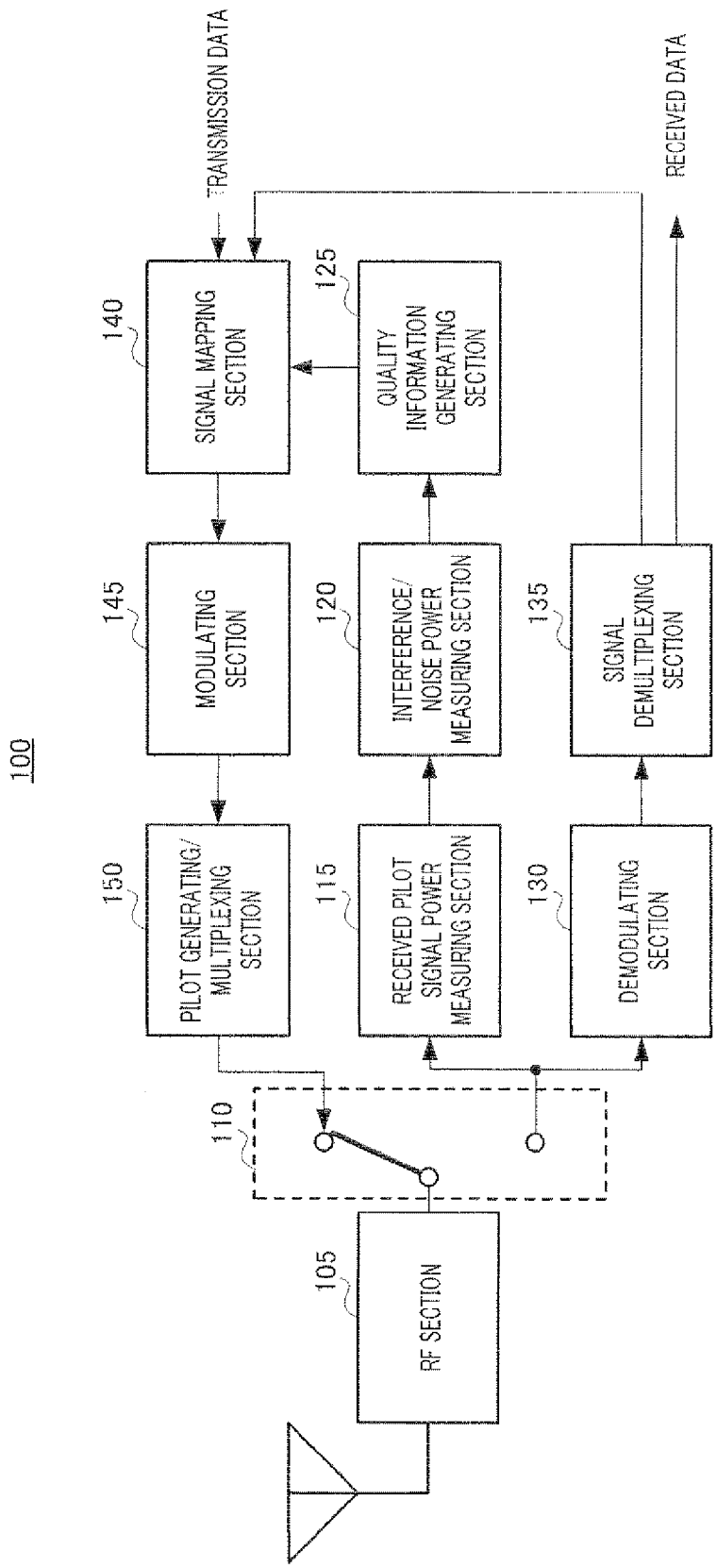
FIG. 3 is a block diagram showing a configuration of a mobile terminal apparatus according to Embodiment 1 of the present invention.

As shown in FIG. 3, mobile terminal apparatus 100 in the wireless communication system according to Embodiment 1 has radio (i.e. RF) section 105, transmission/reception switch 110, received pilot signal power measuring section 115, interference/noise power measuring section 120, quality information generating section 125, demodulating section 130, signal demultiplexing section 135, signal mapping section 140, modulating section 145 and pilot generating/multiplexing section 150. Here, a TDD scheme is applied to a wireless communication system of each embodiment. Furthermore, when uplink and downlink timings are different between cells under a TDD scheme, interference from other cells may increase significantly, and therefore the wireless communication system of each embodiment assumes an inter-cell synchronous TDD system.

In a time zone (i.e. downlink section) allocated to downlink, radio (i.e. RF) section 105 performs predetermined radio reception processing (e.g. down-conversion and A/D conversion) on a received signal received through an antenna, and outputs the obtained signal to the transmission/reception switch. On the other hand, in an uplink section, radio section 105 performs predetermined radio transmission processing (e.g. D/A conversion and up-conversion) on a transmission signal received through the transmission/reception switch, and transmits the obtained radio signal through an antenna.

In the downlink section, transmission/reception switch 110 is switched to the side of demodulating section 130 and received pilot signal power measuring section 115 to place radio section 105 in the electrically conducted state with demodulating section 130 and received pilot signal power measuring section 115. As a result, the signal after the radio reception processing is inputted to demodulating section 130 and received pilot signal power measuring section 115. On the other hand, in the uplink section, the transmission/reception switch is switched to the side of pilot generating/multiplexing section 150 to place pilot generating/multiplexing section 150 in the electrically conducted state with radio section 105. As a result, a modulated signal multiplexed with a pilot is inputted to radio section 105.

Received pilot signal power measuring section 115 measures received power at a timing at which a quality measuring pilot signal of the received signal after the radio reception processing is received. This measured received power is made up of received power of the pilot itself (hereinafter, also referred to as "net received power"), interference power from other cells and noise power within the apparatus.

Interference/noise power measuring section 120 measures interference and noise power components of the measured received power measured in received pilot signal power measuring section 115. The method of measuring the interference and noise power components will be described in detail below.

Quality information generating section 125 has a CQI table. Referring to a CQI table, quality information generating section 125 generates a CQI signal matching the received power measured in received pilot signal power measuring section 115, and the interference and noise power calculated by interference/noise power measuring section 120 as channel quality information. Quality information generating section 125 outputs the generated CQI signal to signal mapping section 140.

Demodulating section 130 performs demodulation processing on the received signal subjected to the radio reception processing, and outputs the obtained demodulated data to signal demultiplexing section 135.

Signal demultiplexing section 135 extracts a band allocation signal from the demodulated data received from demodulating section 130. Signal demultiplexing section 135 outputs the extracted band allocation signal to signal mapping section 140, and thereby reflects the allocated band in the transmission band of signal mapping section 140.

Signal mapping section 140 maps the CQI signal, which is channel quality information received from quality information generating section 125, interference and noise power information, on a signal transmitted in uplink. Furthermore, signal mapping section 140 maps the transmission data on the allocated band matching the band allocation signal received from signal demultiplexing section 135.

Modulating section 145 performs modulation processing on the signal mapped by signal mapping section 140, and outputs the modulated signal to pilot generating/multiplexing section 150.

Pilot generating/multiplexing section 150 generates a pilot signal. Pilot generating/multiplexing section 150 multiplexes a pilot signal with the modulated signal subjected to modulation processing in modulating section 145, and outputs the obtained multiplexed signal to radio section 105.

Figure 4:
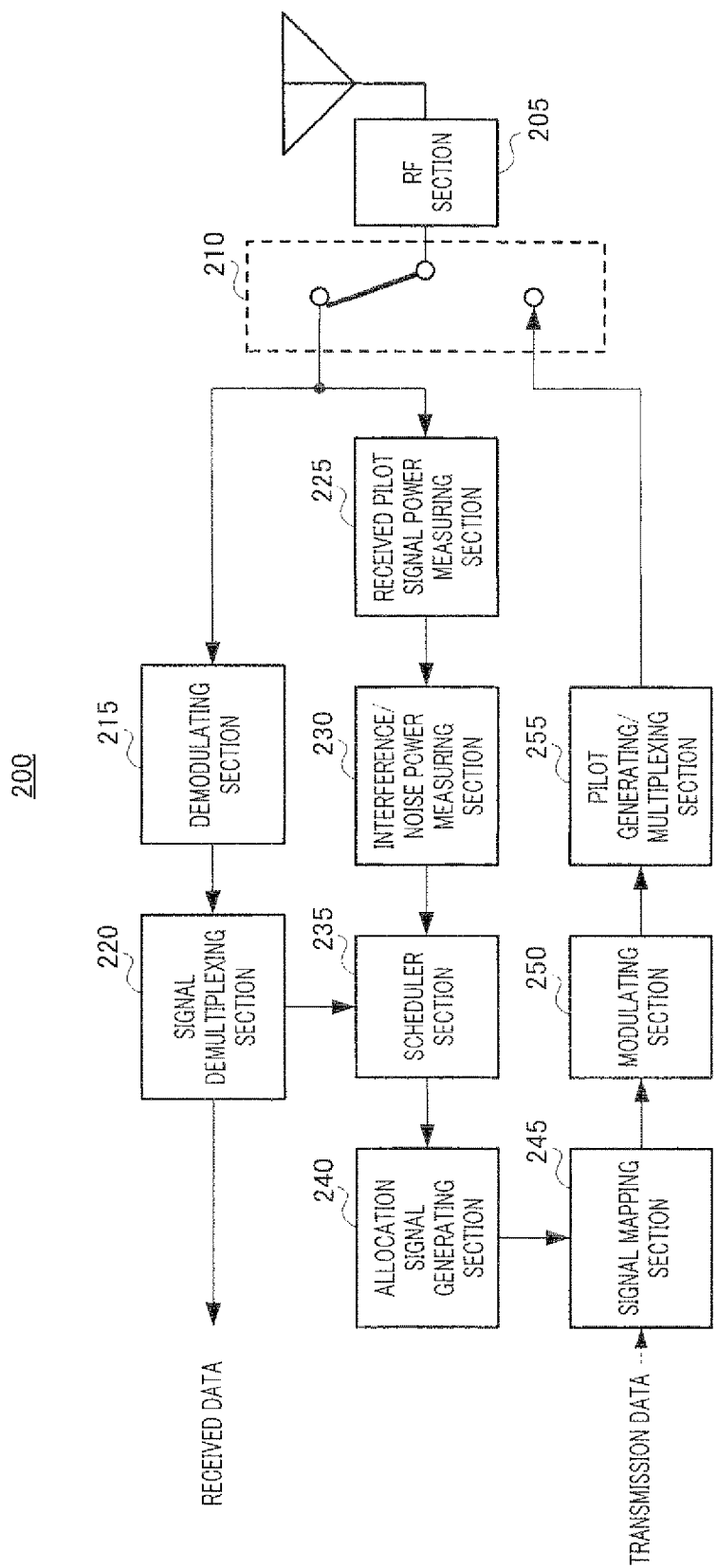
FIG. 4 is a block diagram showing a configuration of a radio base station apparatus according to Embodiment 1.

As shown in FIG. 4, radio base station apparatus 200 of Embodiment 1 has radio section 205, transmission/reception switch 210, demodulating section 215, signal demultiplexing section 220, received pilot signal power measuring section 225, interference/noise power measuring section 230, scheduler section 235, allocation signal generating section 240, signal mapping section 245, modulating section 250 and pilot generating/multiplexing section 255.

In a time zone (i.e. uplink section) allocated to uplink, radio section 205 performs predetermined radio reception processing (e.g. down-conversion and A/D conversion) on a received signal received through an antenna, and outputs the obtained signal to transmission/reception switch 210. On the other hand, in a downlink section, radio section 205 performs predetermined radio transmission processing (e.g. D/A conversion and up-conversion) on a transmission signal received through transmission/reception switch 210, and transmits the obtained radio signal through an antenna.

In an uplink section, transmission/reception switch 210 is switched to the side of demodulating section 215 and received pilot signal power measuring section 225 to place radio section 205 in the electrically conducted state with demodulating section 215 and received pilot signal power measuring section 225. As a result, the signal after the radio reception processing is inputted to demodulating section 215 and received pilot signal power measuring section 225. On the other hand, in the downlink section, transmission/reception switch 210 is switched to the side of pilot generating/multiplexing section 255 to place pilot generating/multiplexing section 255 in the electrically conducted state with radio section 205. As a result, a transmission signal multiplexed with a pilot signal is inputted to radio section 205.

Demodulating section 215 performs demodulation processing on the received signal subjected to the radio reception processing, and outputs the obtained demodulated data to signal demultiplexing section 220.

Signal demultiplexing section 220 demultiplexes the demodulated data into received data, channel quality information, and downlink interference and noise power information. The demultiplexed channel quality information is outputted to scheduler section 235.

Received pilot signal power measuring section 225 measures received power at the timing at which an uplink quality measuring pilot signal of the received signal after the radio reception processing is received. This measured received power is made up of "net received power", interference power from other cells or the like and noise power in the apparatus.

Interference/noise power measuring section 230 measures the uplink interference and noise power of the measured received power measured in received pilot signal power measuring section 225. The method of measuring the interference and noise power components will be described in detail below.

Scheduler section 235 receives the channel quality information, and downlink interference and noise power information from signal demultiplexing section 220. This channel quality information has been transmitted from mobile terminal apparatus 100 located within the cell covered by radio base station apparatus 200. Furthermore, scheduler section 235 receives received power measured in received pilot signal power measuring section 225, and uplink interference and noise power measured in interference/noise power measuring section 230.

Scheduler section 235 performs uplink band allocation and MCS (Modulation and Coding Scheme) selection (that scheduling) based on the received power that is received, and uplink interference and noise power information. To be more specific, scheduler section 235 calculates an uplink SINR using the received power that is received, and uplink interference and noise power information. Referring to the CQI table that is held, scheduler section 235 selects MCS matching CQI based on the calculated uplink SINR.

Furthermore, scheduler section 235 performs a downlink band and timing allocation, and MCS selection based on the received channel quality information, and downlink interference and noise power information. The result of the scheduling performed by scheduler section 235 is outputted to allocation signal generating section 240.

Allocation signal generating section 240 generates a scheduling control signal according to the scheduling result from scheduler section 235, and outputs the obtained scheduling control signal to signal mapping section 245.

Signal mapping section 245 maps the uplink allocation signal received from allocation signal generating section 240, on the signal transmitted in downlink. Furthermore, signal mapping section 245 maps the transmission data on an allocated band matching the downlink allocation signal received from scheduler section 235.

Modulating section 250 performs modulation processing on the signal mapped by the signal mapping section, and outputs the modulated signal to pilot generating/multiplexing section 255.

Pilot generating/multiplexing section 255 generates a pilot signal. Pilot generating/multiplexing section 255 multiplexes the generated pilot signal with the modulated signal received from modulating section 250, and outputs the multiplexed signal to radio section 205.

Figure 5:
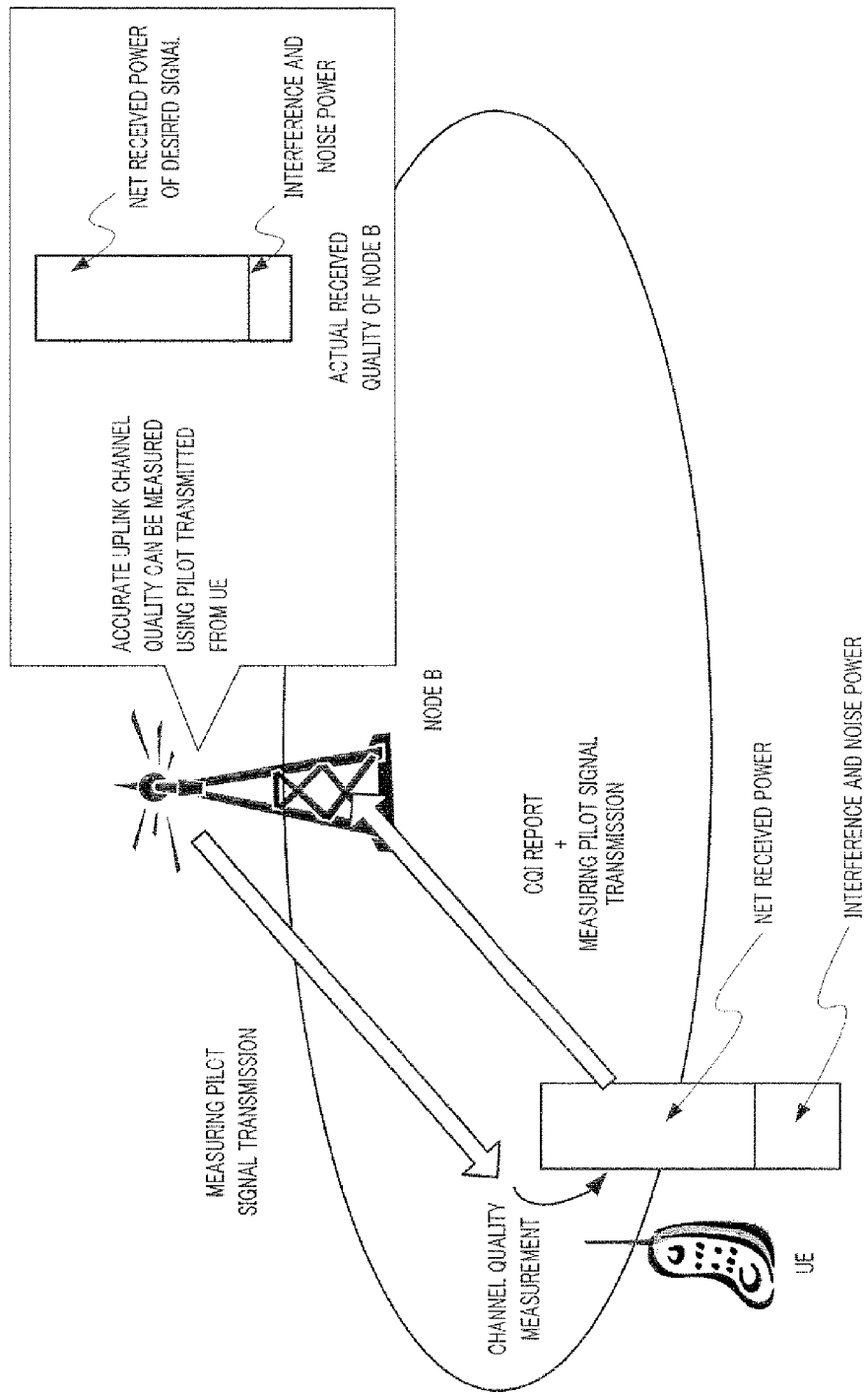
FIG. 5 illustrates operations of the wireless communication system according to Embodiment 1.

Next, operations of mobile terminal apparatus 100 and radio base station apparatus 200 having the above-described configurations will be described with reference to FIG. 5.

Scheduling in downlink is the same as that in a wireless communication system to which a conventional TDD scheme is applied.

That is, mobile terminal apparatus 100 reports to radio base station apparatus 200 a CQI signal matching the received power of a pilot signal transmitted from radio base station apparatus 200 in downlink. Radio base station apparatus 200 performs downlink scheduling based on the reported CQI signal.

On the other hand, scheduling in uplink will be performed as follows.

First, mobile terminal apparatus 100 transmits a signal multiplexed with a pilot signal by pilot generating/multiplexing section 150.

Radio base station apparatus 200 measures received power at the timing at which received pilot signal power measuring section 225 receives a pilot signal transmitted from mobile terminal apparatus 100 in uplink. Furthermore, interference/noise power measuring section 230 measures the uplink interference and noise power of the measured received power measured in received pilot signal power measuring section 225.

Here, an example of the method of measuring interference and noise power components will be described in detail.

A plurality of received signals at the timing at which a quality measuring pilot signal is received are added up in phase and then averaged. This averaging reduces influences of random interference and noise, and therefore the averaged received signal can be regarded as the received pilot signal itself. Therefore, although there is a difference between the averaged received signal and received signal before averaging, this can be regarded as having originated from the interference signal and noise signal. Therefore, interference and noise power can be determined by calculating distribution of the difference. Furthermore, other methods of calculating interference and noise power may also be used.

Scheduler section 235 then performs uplink band allocation and MCS selection based on the received power measured in received pilot signal power measuring section 225, and the uplink interference and noise power information measured in interference/noise power measuring section 230.

Figure 6:
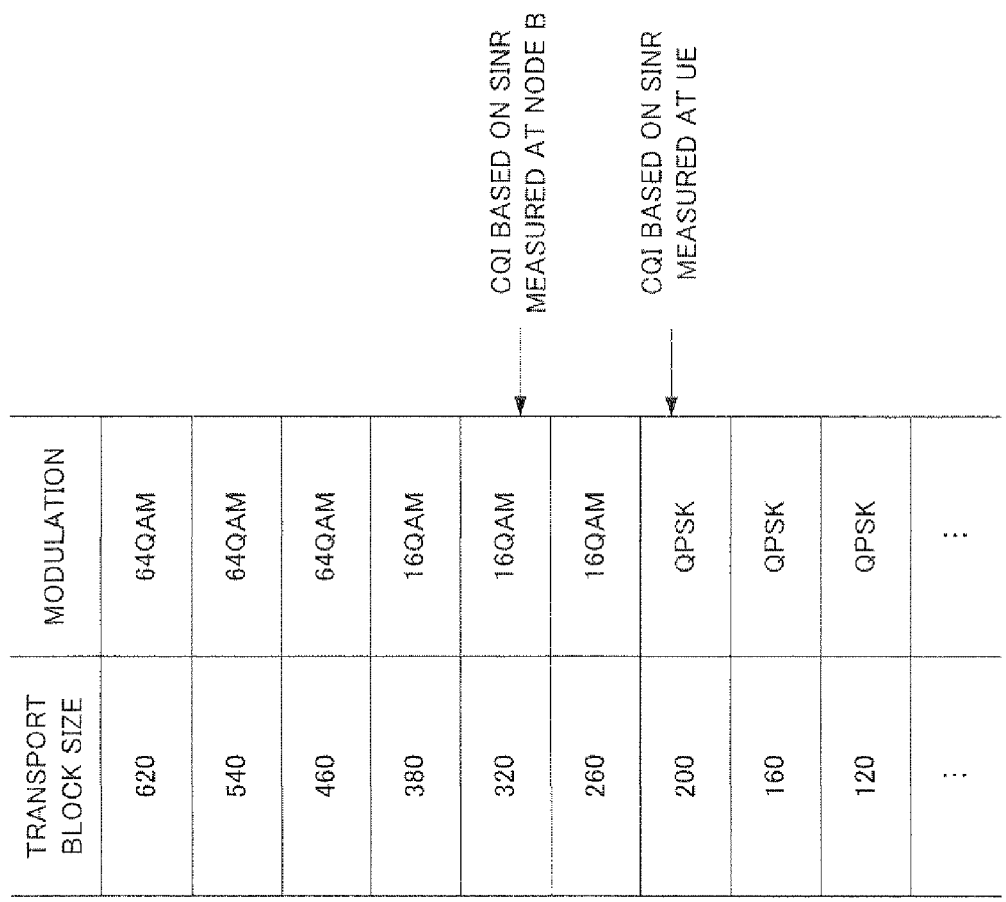
FIG. 6 illustrates a CQI table held in the scheduler section in FIG. 4.

To be more specific, scheduler section 235 holds a CQI table shown in FIG. 6. Scheduler section 235 calculates an uplink SINR using the received power measured in received pilot signal power measuring section 225, and uplink interference and noise power information measured in interference/noise power measuring section 230. "Net received power" removing the influences of the uplink interference and noise power from the measured received power, is necessary to calculate an SINR. The uplink pilot signal is transmitted from mobile terminal apparatus 100 to allow such that radio base station apparatus 200 calculate "net received power", and, consequently, can be considered as information for radio base station apparatus 200 to learn "net received quality". Then, referring to the CQI table that is held, scheduler section 235 selects MCS matching CQI based on the calculated uplink SINR.

Thus, according to the present embodiment, in radio base station apparatus 200, scheduler section 235 performs uplink band allocation and MCS selection based on the received power upon receiving a pilot signal transmitted in uplink, and uplink interference and noise power.

This makes it possible to perform uplink hand allocation and MCS selection that accurately reflect the uplink communication environment.

That is, received pilot signal power measuring section 225 and interference/noise power measuring section 230 calculate received power, and uplink interference and noise power using the pilot signal received in uplink, so that scheduler section 235 can learn an accurate uplink communication environment from these parameters. Therefore, as shown in FIG. 6, even if the SINR measured in mobile terminal apparatus 100 is quite different from the SINR measured in radio base station apparatus 200 and CQIs matching those SINRs are also different, it is possible to perform uplink band allocation and MCS selection that accurately reflect the uplink communication environment.

As a result, the uplink scheduling can be performed accurately, so that it is possible to improve system throughput.

Although the CQI table in FIG. 6 shows only modulation schemes and transmission block sizes, items defined as the CQI table are not limited to these. The CQI table may also be defined including, for example, a coding rate, power of pilot signals simultaneously transmitted and the number of times of code multiplexing or spreading factor/repetition factor when code multiplexing is performed.

Furthermore, according to the present embodiment, mobile terminal apparatus 100 transmits a pilot signal generated in pilot generating/multiplexing section 150 in uplink.

This allows radio base station apparatus 200, which is the receiving side of the pilot signal, to use the received pilot signal to measure received power, and uplink interference and noise power. As described above, radio base station apparatus 200 performs uplink band allocation and MCS selection based on the received power, and uplink interference and noise power, so that it is possible to improve system throughput. By the way, no pilot signal is transmitted in uplink in a wireless communication system to which a conventional TDD scheme is applied.

Embodiment 2

Figure 7:
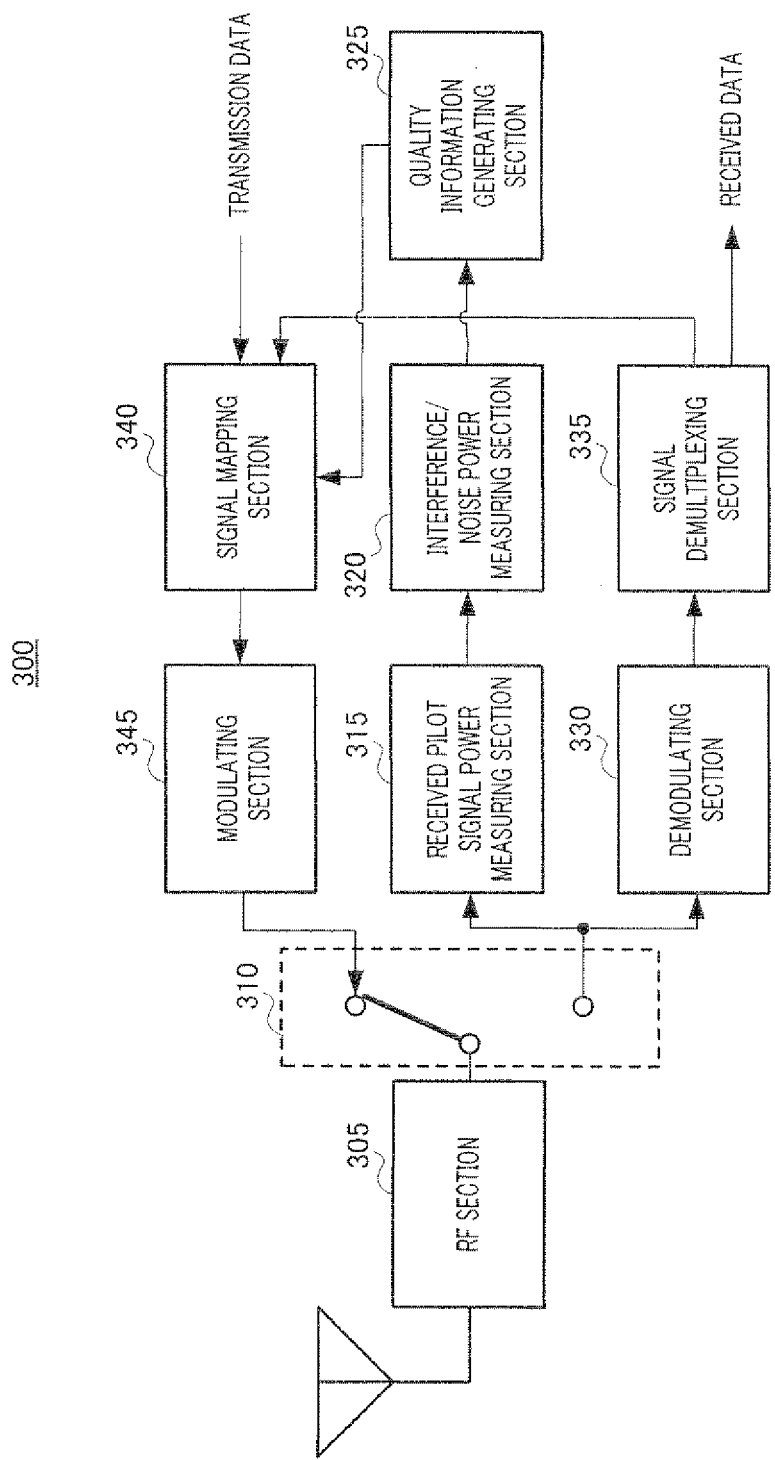
FIG. 7 is a block diagram showing a configuration of a mobile terminal apparatus according to Embodiment 2.

As shown in FIG. 7, mobile terminal apparatus 300 in a wireless communication system according to Embodiment 2 has radio (RF) section 305, transmission/reception switch 310, received pilot signal power measuring section 315, interference/noise power measuring section 320, quality information generating section 325, demodulating section 330, signal demultiplexing section 335, signal mapping section 340 and modulating section 345. A TDD scheme is also applied to the wireless communication system of Embodiment 2.

In a time zone (i.e. downlink section) allocated to downlink, radio (RF) section 305 performs predetermined radio reception processing (e.g. down-conversion and A/D conversion) on a received signal received through an antenna, and outputs the obtained signal to a transmission/reception switch. On the other hand, in an uplink section, radio section 305 performs predetermined radio transmission processing (e.g. D/A conversion and up-conversion) on a transmission signal received through the transmission/reception switch, and transmits the obtained radio signal through the antenna.

In a downlink section, the transmission/reception switch is switched to the side of demodulating section 330 and received pilot signal power measuring section 315 to place radio section 305 in the electrically conducted state with demodulating section 330 and received pilot signal power measuring section 315. As a result, the signal after the radio reception processing is inputted to demodulating section 330 and received pilot signal power measuring section 315. On the other hand, in an uplink section, the transmission/reception switch is switched to the side of modulating section 345 to place modulating section 345 in the electrically conducted state with radio section 305. As a result, the signal after the modulation processing is inputted to radio section 305.

Received pilot signal power measuring section 315 measures received power at the timing at which a quality measuring pilot signal of the received signal after the radio reception processing is received. This measured received power is made up of received power of a pilot itself (hereinafter, also referred to as "net received power"), interference power from other cells or the like and noise power within the apparatus.

Interference/noise power measuring section 320 measures interference and noise power components of the measured received power measured in received pilot signal power measuring section 315. The method of measuring the interference and noise power components will be described in detail below.

Quality information generating section 325 calculates "net received power" by subtracting the interference and noise power components measured in interference/noise power measuring section 320, from the measured received power measured in received pilot signal power measuring section 315. Quality information generating section 325 generates channel quality information matching the calculated "net received power", and outputs this channel quality information to signal mapping section 340. Quality information generating section 325 outputs the interference and noise power components measured in interference/noise power measuring section 320 together with the channel quality information, to signal mapping section 340.

Demodulating section 330 performs demodulation processing on the received signal subjected to the radio reception processing, and outputs the obtained demodulated data to signal demultiplexing section 335.

Signal demultiplexing section 335 extracts a band allocation signal from the demodulated data received from demodulating section 330. Signal demultiplexing section 335 outputs the extracted band allocation signal to signal mapping section 340, and reflects the allocated band in the transmission band and timing of signal mapping section 340.

Signal mapping section 340 maps the channel quality information and interference and noise power information received from quality information generating section 325, on a signal transmitted in uplink. Furthermore, signal mapping section 340 maps transmission data on an allocated band matching the band allocation signal received from signal demultiplexing section 335.

Modulating section 345 performs modulation processing on the signal mapped in signal mapping section 340, and outputs the modulated signal to radio section 305.

Figure 8:
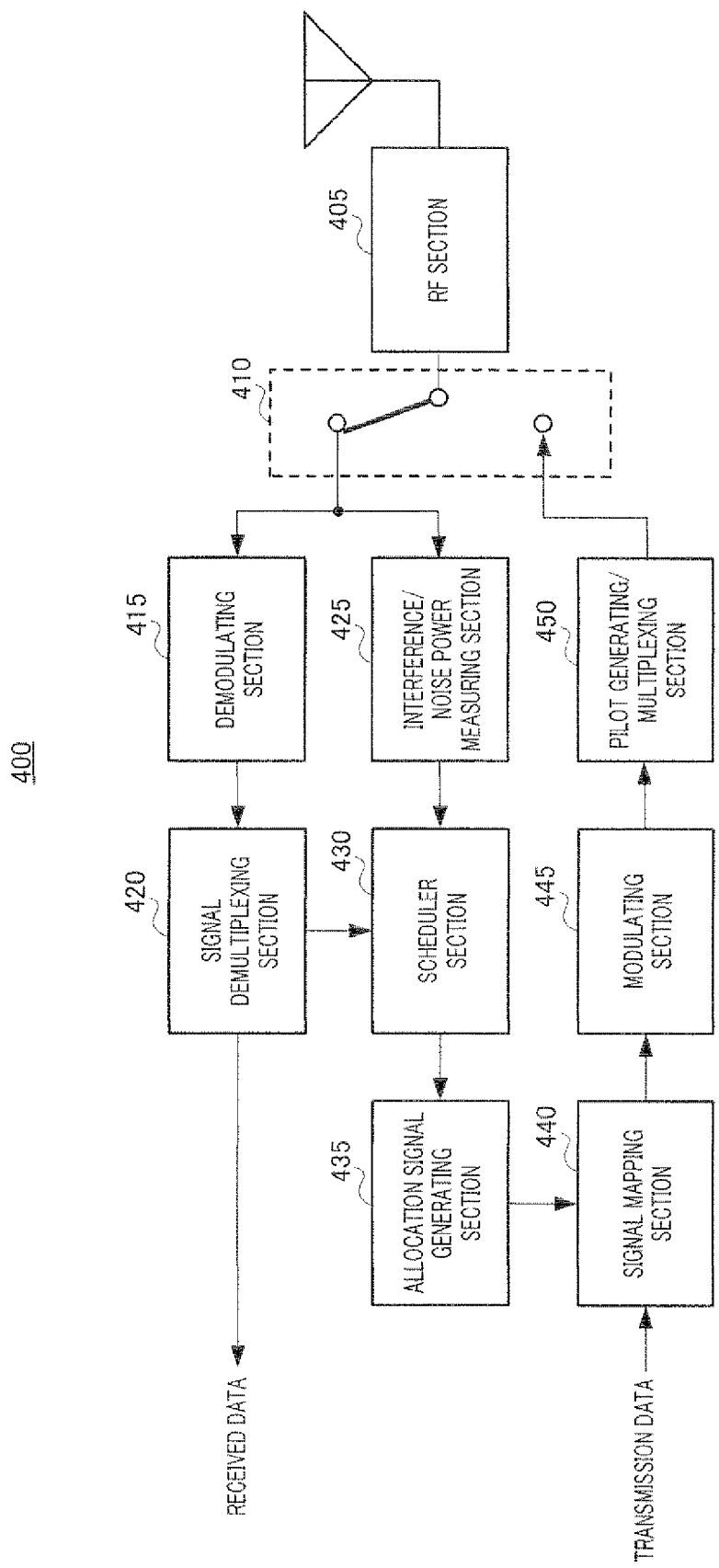
FIG. 8 is a block diagram showing a configuration of a radio base station apparatus according to Embodiment 2.

As shown in FIG. 8, radio base station apparatus 400 according to Embodiment 2 has radio (i.e. RF) section 405, transmission/reception switch 410, demodulating section 415, signal demultiplexing section 420, interference/noise power measuring section 425, scheduler section 430, allocation signal generating section 435, signal mapping section 440, modulating section 445 and pilot generating/multiplexing section 450.

In a time zone allocated in uplink (i.e. uplink section), radio section 405 performs predetermined radio reception processing (e.g. down-conversion and A/D conversion) on a received signal received through an antenna, and outputs the obtained signal to transmission/reception switch 410. On the other hand, in a downlink section, radio section 405 performs predetermined radio transmission processing (e.g. D/A conversion and up-conversion) on a transmission signal received through the transmission/reception switch, and transmits the obtained radio signal through the antenna.

In the uplink section, transmission/reception switch 410 is switched to the side of demodulating section 415 and interference/noise power measuring section 425 to place radio section 405 in the electrically conducted state with demodulating section 415 and interference/noise power measuring section 425. As a result, the signal after the radio reception processing is inputted to demodulating section 415 and interference/noise power measuring section 425. On the other hand, in the downlink section, transmission/reception switch 410 is switched to the side of pilot generating/multiplexing section 450 to place pilot generating/multiplexing section 450 in the electrically conducted state with radio section 405. As a result, a transmission signal multiplexed with a pilot signal is inputted to radio section 405.

Demodulating section 415 performs demodulation processing on the received signal subjected to the radio reception processing, and outputs the obtained demodulated data to signal demultiplexing section 420.

Signal demultiplexing section 420 demultiplexes the demodulated data into received data, channel quality information, and downlink interference and noise power information. The demultiplexed channel quality information, and downlink interference and noise power information are outputted to scheduler section 430.

Interference/noise power measuring section 425 measures uplink interference and noise power. With the present embodiment, unlike Embodiment 1, no pilot is transmitted in uplink. Therefore, interference/noise power measuring section 425 measures received power at the timing at which no signal is received from mobile terminal apparatus 300 within the cell covered by radio base station apparatus 400 in the uplink section. The measured received power obtained at this time is uplink interference and noise power, and includes interference power from other cells or the like and noise power within radio base station apparatus 400. Other methods of calculating interference and noise power may also be used.

Scheduler section 430 receives channel quality information, and downlink interference and noise power information from signal demultiplexing section 420. This channel quality information is transmitted from mobile terminal apparatus 300 located within the cell covered by radio base station apparatus 400. Furthermore, scheduler section 430 receives the uplink interference and noise power measured in interference/noise power measuring section 425.

Scheduler section 430 performs uplink band allocation and MCS (Modulation and Coding Scheme) selection (that is, scheduling) based on the channel quality information matching received downlink net received power, and uplink interference and noise power information. Furthermore, scheduler section 430 performs downlink band allocation and MCS selection based on the channel quality information matching the received downlink net received power, and downlink interference and noise power information. The result of the scheduling performed in scheduler section 430 is outputted to allocation signal generating section 435.

Allocation signal generating section 435 generates a scheduling control signal according to the scheduling result from scheduler section 430, and outputs the obtained scheduling control signal to signal mapping section 440.

Signal mapping section 440 maps the uplink allocation signal received from allocation signal generating section 435, on a signal transmitted in downlink. Furthermore, signal mapping section 440 maps the transmission data on the allocated band matching the downlink allocation signal received from scheduler section 430.

Modulating section 445 performs modulation processing on the signal mapped in the signal mapping section, and outputs the modulated signal to pilot generating/multiplexing section 450.

Pilot generating/multiplexing section 450 generates a pilot signal. Pilot generating/multiplexing section 450 multiplexes the generated pilot signal with the modulated signal received from modulating section 445, and outputs the multiplexed signal to radio section 405.

Next, operations of mobile terminal apparatus 300 and radio base station apparatus 400 configured as described above will be described.

Mobile terminal apparatus 300 receives a channel quality measuring pilot signal transmitted from radio base station apparatus 400 in downlink.

In mobile terminal apparatus 300, received pilot signal power measuring section 315 measures received power at the timing at which a quality measuring pilot signal is received.

Figure 9:
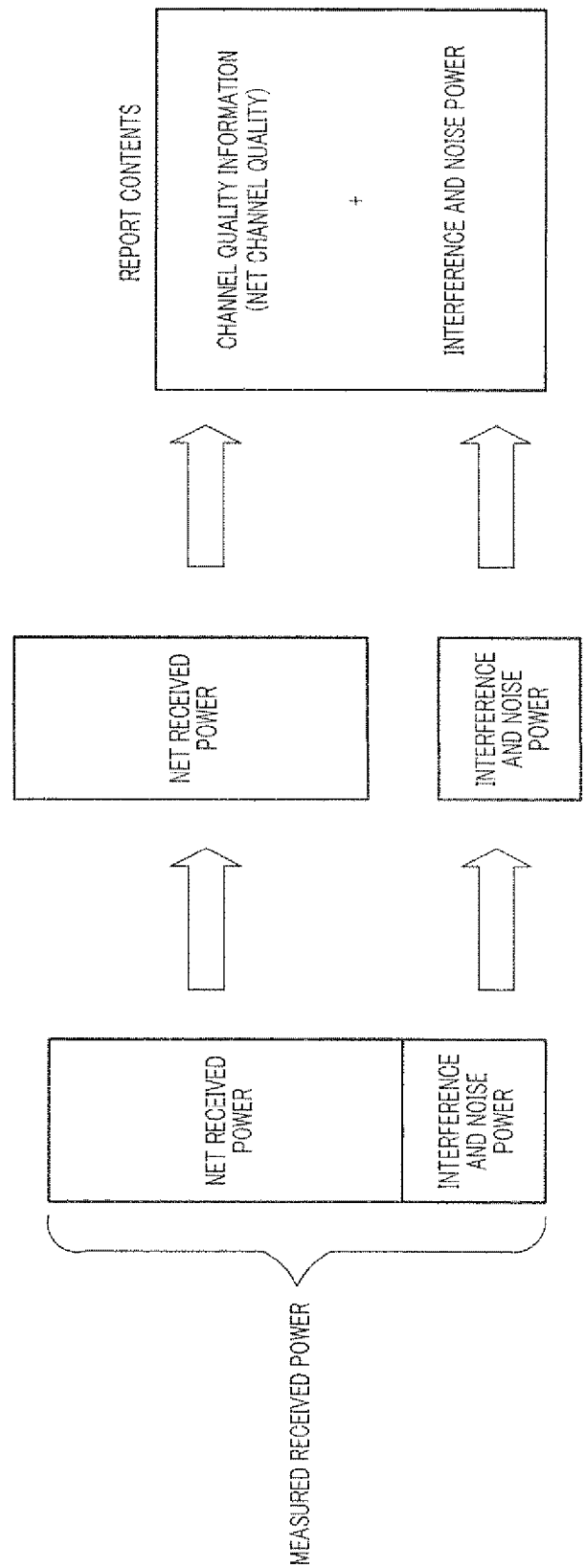
FIG. 9 illustrates report contents reported from the mobile terminal apparatus in FIG. 7.

This measured received power includes "net received power", and downlink interference and noise power as shown in FIG. 9 (left figure).

Interference/noise power measuring section 320 calculates downlink interference and noise power of the measured received power.

Here, an example of the method of calculating the downlink interference and noise power in interference/noise power measuring section 320 will be described.

First, a plurality of received signals at the timing at which a quality measuring pilot signal is received are added up in phase and then averaged. This averaging reduces influences of random interference and noise, and therefore the averaged received signal can be regarded as the received pilot signal itself. Therefore, although there is a difference between the averaged received signal and received signal before averaging, this can be regarded as having originated from the interference signal and noise signal.

Therefore, interference and noise power can be determined by calculating distribution of the difference. By the way, other methods of calculating the interference and noise power may also be used.

Next, quality information generating section 325 subtracts downlink interference and noise power components from the measured received power, and thereby calculates "net received power". By this means, it is possible to obtain the received power matching the pilot signal itself from which the interference and noise power has been removed. Thus, as shown in FIG. 9 (central figure), it is possible to calculate "net received power", and downlink interference and noise power from the measured received power.

The obtained "net received power" is reported to radio base station apparatus 400 in the form of channel quality information as shown in FIG. 9 (right figure). There can be various reporting methods. For example, the range of values that the "net received power" can have may be divided into a plurality of power regions, and region identification information may be assigned to each power region. That is, a map made up of a power region and region identification information corresponding thereto may be provided. The region identification information of the power region including the calculated "net received power" indicates "net channel quality", and is reported to radio base station apparatus 400 as channel quality information. The above-described map is also prestored in radio base station apparatus 400. The reported "net received power" is finally mapped on MCS in radio base station apparatus 400. Therefore, the above-described map may be divided as finely as the conventional CQI map.

Furthermore, the downlink interference and noise power calculated in interference/noise power measuring section 320 is also reported to radio base station apparatus 400 as information different from "net channel quality" as shown in FIG. 9 (right figure).

In radio base station apparatus 400, signal demultiplexing section 420 acquires "net channel quality" transmitted from mobile terminal apparatus 300, and downlink interference and noise power.

Scheduler section 430 performs uplink scheduling based on the "net channel quality" acquired in signal demultiplexing section 420, and the uplink interference and noise power measured in interference/noise power measuring section 425. To be more specific, scheduler section 430 prestores the above-described map, and can estimate "net received power" matching the "net channel quality" from this map. The "net channel quality" is "information indicating net received power", so that it is possible to estimate "net received power" from the "net channel quality". Then, scheduler section 430 calculates an uplink SINR using the estimated "net received power", and the measured uplink interference and noise power. Then, scheduler section 430 performs uplink scheduling based on the calculated uplink SINR.

Furthermore, scheduler section 430 performs downlink scheduling based on the "net channel quality" acquired in signal demultiplexing section 420, and the downlink interference and noise power. To be more specific, scheduler section 430 prestores the above-described map, and can estimate the "net received power" matching the "net channel quality" from this map. Then, scheduler section 430 calculates a downlink SINR using the estimated "net received power", and the downlink interference and noise power acquired in signal demultiplexing section 420. Then, scheduler section 430 performs uplink scheduling based on the calculated uplink SINR.

Thus, according to the present embodiment, in radio base station apparatus 400, scheduler section 430 performs uplink band allocation and MCS selection based on net channel quality removing influences of interference and noise power, and uplink interference and noise power components.

Thus, it is possible to learn an accurate uplink communication environment from the net channel quality, and uplink interference and noise power components, and further perform uplink band allocation based on these parameters. As a result, it is possible to perform uplink scheduling accurately, so that it is possible to improve system throughput.

In the aforementioned conventional wireless communication system to which a TDD scheme is applied in particular, even in a circumstance where the accuracy of uplink scheduling deteriorates, that is, in a circumstance where there is a significant difference between interference and noise power observed in the mobile terminal apparatus and the interference and noise power observed in the radio base station apparatus, it is possible to perform uplink scheduling adequately.

Furthermore, according to the present embodiment, no pilot signal is transmitted from mobile terminal apparatus 300 in uplink, so that radio base station apparatus 400 acquires net channel quality removing influences of interference and noise power transmitted from mobile terminal apparatus 300.

Thus, radio base station apparatus 400 need not perform processing such as channel quality measurement using a pilot signal, so that it is possible to reduce the amount of processing of radio base station apparatus 400. Furthermore, mobile terminal apparatus 300 transmits net channel quality, which is information, to radio base station apparatus 400, and, consequently, can reduce power consumption more than when mobile terminal apparatus 300 transmits a pilot signal formed with a known signal sequence having a certain length as in the case of Embodiment 1.

Furthermore, radio base station apparatus 400 acquires downlink interference and noise power from mobile terminal apparatus 300 in addition to the net channel quality removing influences of interference and noise power.

By this means, it is possible to perform downlink scheduling based on channel quality that takes into account downlink interference and noise power as in the case of the prior art.

Furthermore, according to the present embodiment, in mobile terminal apparatus 300, received pilot signal power measuring section 315 measures received power upon receiving a pilot signal transmitted in downlink, and interference/noise power measuring section 320 calculates downlink interference and noise power.

This allows quality information generating section 325 to calculate net received power after correcting the measured received power by using the obtained downlink interference and noise power in interference/noise power measuring section 320. Furthermore, quality information generating section 325 can determine net channel quality based on the net received power.

As the method of calculating power of a received pilot signal, a method for obtaining a power calculation result essentially removing influences of interference and noise power, may be used. In short, quality information generating section 325 only needs to be able to determine net channel quality based on the net received power after correcting the measured received power, by using the downlink interference and noise power.

However, when the power calculation method for obtaining a power calculation result essentially removing influences of interference and noise power, is used, received pilot signal power measuring section 315 acquires received power removing interference and noise power from received power upon receiving a pilot signal transmitted in downlink. Then, quality information generating section 325 determines net channel quality based on this acquired received power.

Then, mobile terminal apparatus 300 transmits the net channel quality acquired as described above.

This allows radio base station apparatus 400 to perform scheduling by accurately reflecting the uplink communication environment based on the net channel quality transmitted from mobile terminal apparatus 300, and the uplink interference and noise power measured in radio base station apparatus 400.

Furthermore, mobile terminal apparatus 300 also transmits downlink interference and noise power.

This allows radio base station apparatus 400 to perform downlink scheduling based on channel quality that also takes into account downlink interference and noise power as in the case of the prior art.

Embodiment 3

According to Embodiment 2, the mobile terminal apparatus reports net channel quality, and downlink interference and noise power to the radio base station apparatus. By contrast, according to the present embodiment, instead of the net channel quality, the mobile terminal apparatus reports CQI as in the case of the prior art. The radio base station apparatus calculates net channel quality using the reported CQI, and downlink interference and noise power. That is, CQI can be considered as information for the radio base station apparatus to learn "net received quality".

Figure 10:
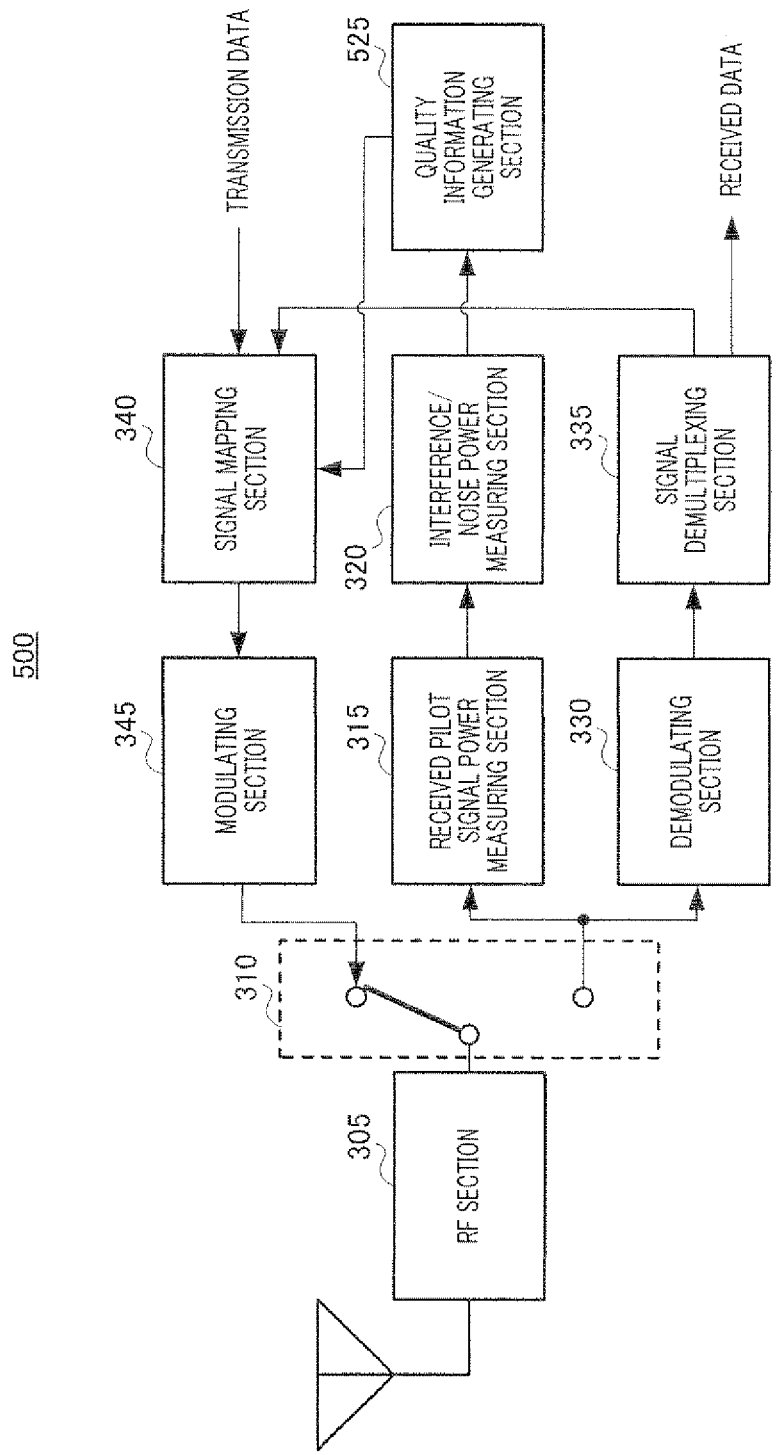
FIG. 10 is a block diagram showing a configuration of a mobile terminal apparatus according to Embodiment 3.

As shown in FIG. 10, mobile terminal apparatus 500 of Embodiment 3 has quality information generating section 525.

Figure 11:
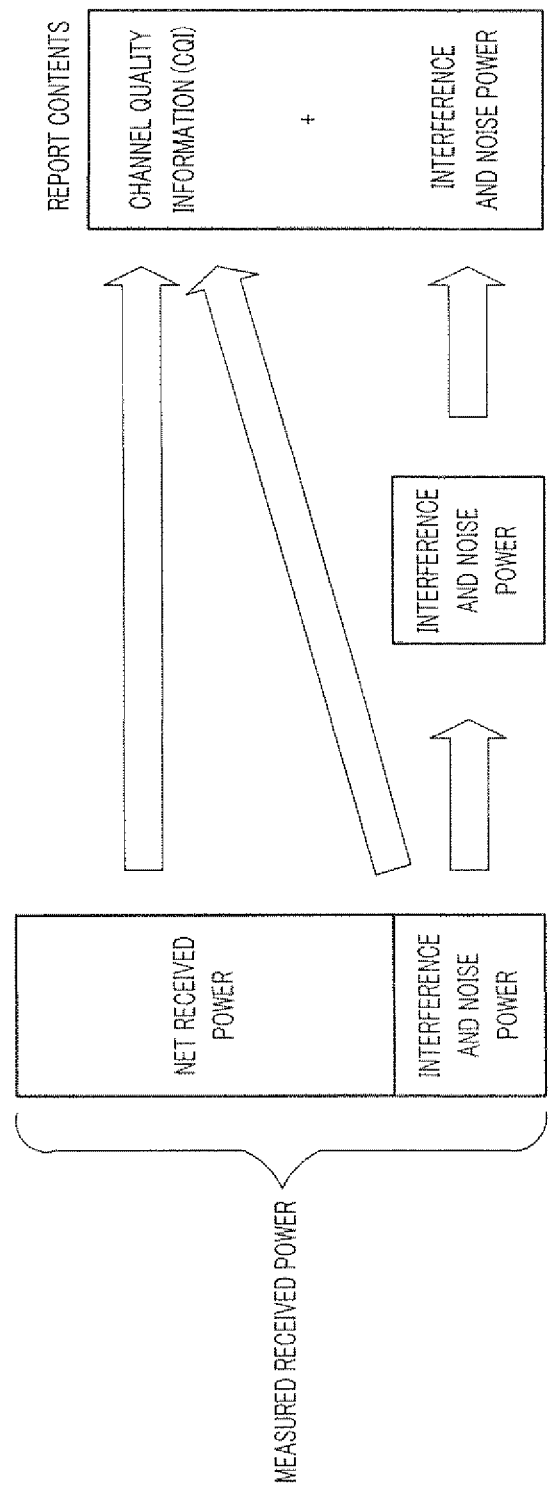
FIG. 11 illustrates report contents reported from the mobile terminal apparatus in FIG. 10.

Quality information generating section 525 has a CQI table. Referring to the CQI table, quality information generating section 525 generates a CQI signal matching received power measured in received pilot signal power measuring section 315. Quality information generating section 525 outputs to signal mapping section 340 the generated CQI signal, and the interference and noise power calculated in interference/noise power measuring section 320. That is, with the present embodiment, the CQI signal similar to that in the prior art, and downlink interference and noise power are reported to the radio base station apparatus as shown in FIG. 11.

Figure 12:
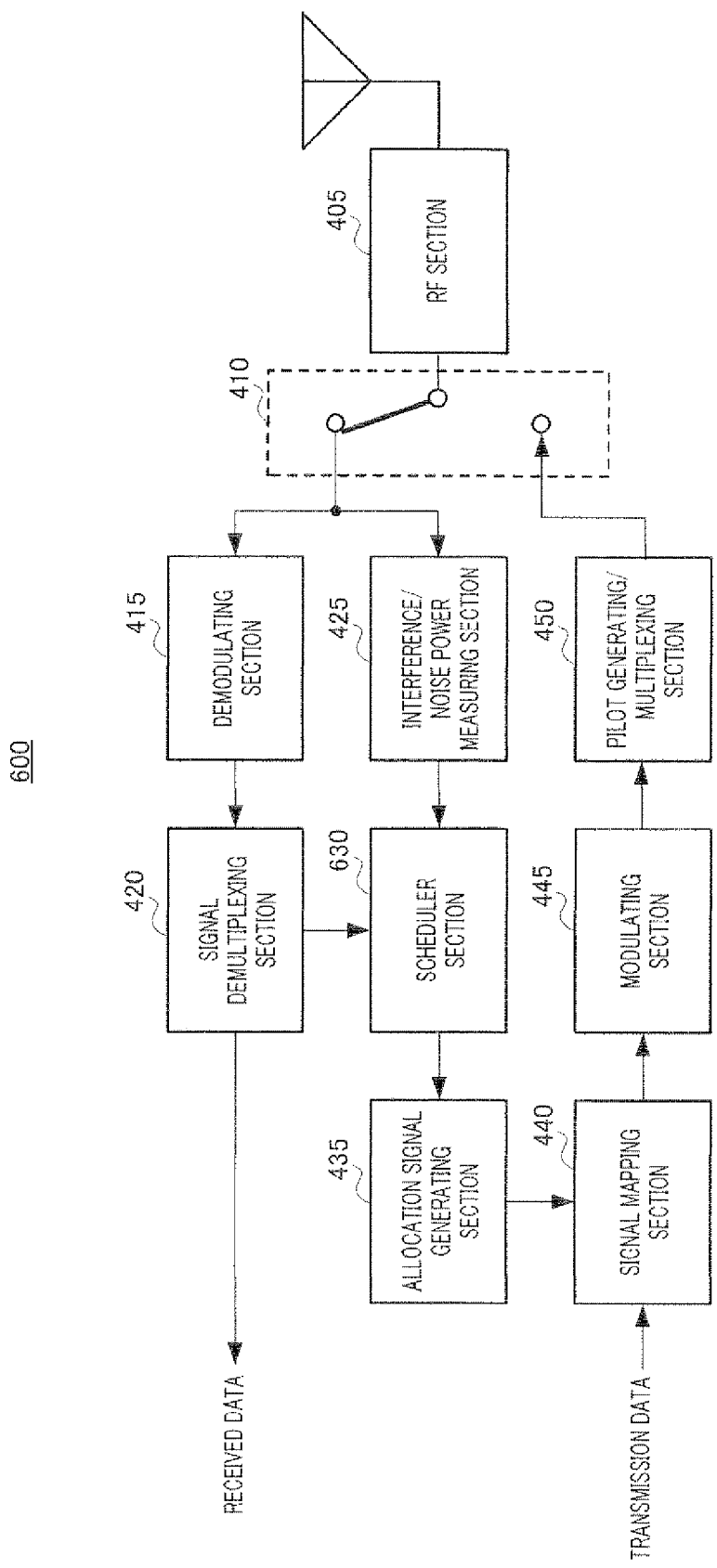
FIG. 12 is a block diagram showing a configuration of a radio base station apparatus according to Embodiment 3.

As shown in FIG. 12, radio base station apparatus 600 according to Embodiment 3 has scheduler section 630.

Scheduler section 630 receives the CQI signal transmitted from mobile terminal apparatus 500, and downlink interference and noise power through signal demultiplexing section 420. Scheduler section 630 calculates net channel quality based on the CQI signal, and downlink interference and noise power. To be more specific, scheduler section 630 can estimate received power (including downlink interference and noise power) measured in mobile terminal apparatus 500 from the CQI signal. Then, scheduler section 630 calculates net channel quality based on the estimated measured received power, and downlink interference and noise power.

Scheduler section 630 performs uplink scheduling based on the calculated net channel quality, and the uplink interference and noise power measured in interference/noise power measuring section 425.

In such a configuration, radio base station apparatus 600 can acquire net channel quality removing influences of interference and noise power, and the uplink interference and noise power components, so that it is possible to obtain the same effects as in Embodiment 2.

Furthermore, according to the present embodiment, basically, mobile terminal apparatus 500 only needs to report a CQI signal similar to that of the prior art, and downlink interference and noise power to radio base station apparatus 600, and can increase compatibility with the conventional system compared to Embodiment 2, so that it is possible to reduce the development load and amount of processing of the entire system including the base station and the mobile terminal apparatus.

Embodiment 4

According to Embodiment 2 and Embodiment 3, channel quality information (to be more specific, net channel quality with Embodiment 2 and CQI signal similar to that of the prior art with Embodiment 3), and downlink interference and noise power are reported to the radio base station apparatus with the same frequency. By contrast, with the present embodiment, the frequency to report downlink interference and noise power is reduced compared to the frequency to report channel quality information.

Figure 13:
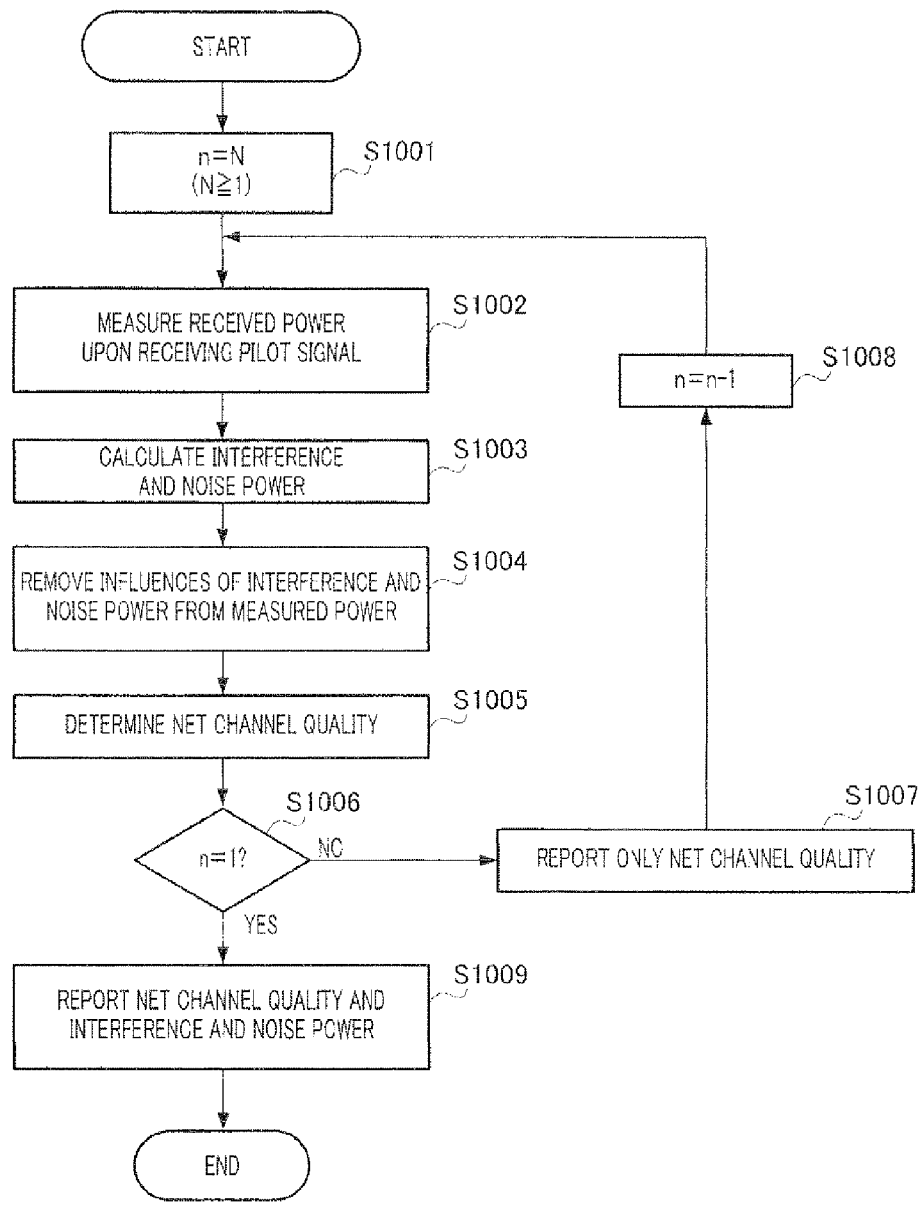
FIG. 13 is a flowchart showing another example of reporting processing performed by the mobile terminal apparatus in FIG. 7.

A case will be described with reference to FIG. 13 where the present embodiment is applied to the wireless communication system of Embodiment 2. Note that the processing in step S1002 to step S1005 in the flowchart of FIG. 13 corresponds to the processing in received pilot signal power measuring section 315, interference/noise power measuring section 320 and quality information generating section 325 described in Embodiment 2.

In step S1001, quality information generating section 325 initially sets the value of n to N (where N is a natural number of 1 or greater). When N is 1, the frequency to report the downlink interference and noise power is equal to the frequency to report the channel quality information, and, when N is 2 or greater, the frequency to report the downlink interference and noise power is smaller than the frequency to report the channel quality information.

In step S1002, received pilot signal power measuring section 315 measures received power at the timing at which a quality measuring pilot signal of the received signal after the radio reception processing is received.

In step S1003, interference/noise power measuring section 320 calculates the interference and noise power components of the measured received power measured in received pilot signal power measuring section 315.

In step S1004, quality information generating section 325 removes the interference and noise power components measured in interference/noise power measuring section 320, from the measured received power measured in received pilot signal power measuring section 315. "Net received power" is determined in this way.

In step S1005, quality information generating section 325 determines the channel quality (i.e. net channel quality) matching the calculated "net received power".

In step S1006, quality information generating section 325 decides whether or not the current value of n is 1.

When n is not 1, quality information generating section 325 decides that it is not the timing to report interference and noise power, and reports only net channel quality to radio base station apparatus 400 in step S1007.

In step S1008, quality information generating section 325 decrements the value of n. The processing step returns to step S1002.

When n is decided to be 1 in step S1006, quality information generating section 325 decides that it is the timing to report the interference and noise power, and reports the interference and noise power together with the net channel quality to radio base station apparatus 400 in step S1009.

Radio base station apparatus 400 performs downlink scheduling based on the reported net channel quality, interference and noise power. However, the interference and noise power are reported only once N times the net channel quality is reported. Therefore, radio base station apparatus 400 performs downlink scheduling using the interference and noise power reported most recently. Thus, even if the frequency to report interference and noise power is reduced, the variation in interference and noise power is less than the variation in net channel quality, and therefore there is no considerable influence on the accuracy of scheduling. By reducing the frequency to report interference and noise power, it is possible to reduce system traffic.

Figure 14:
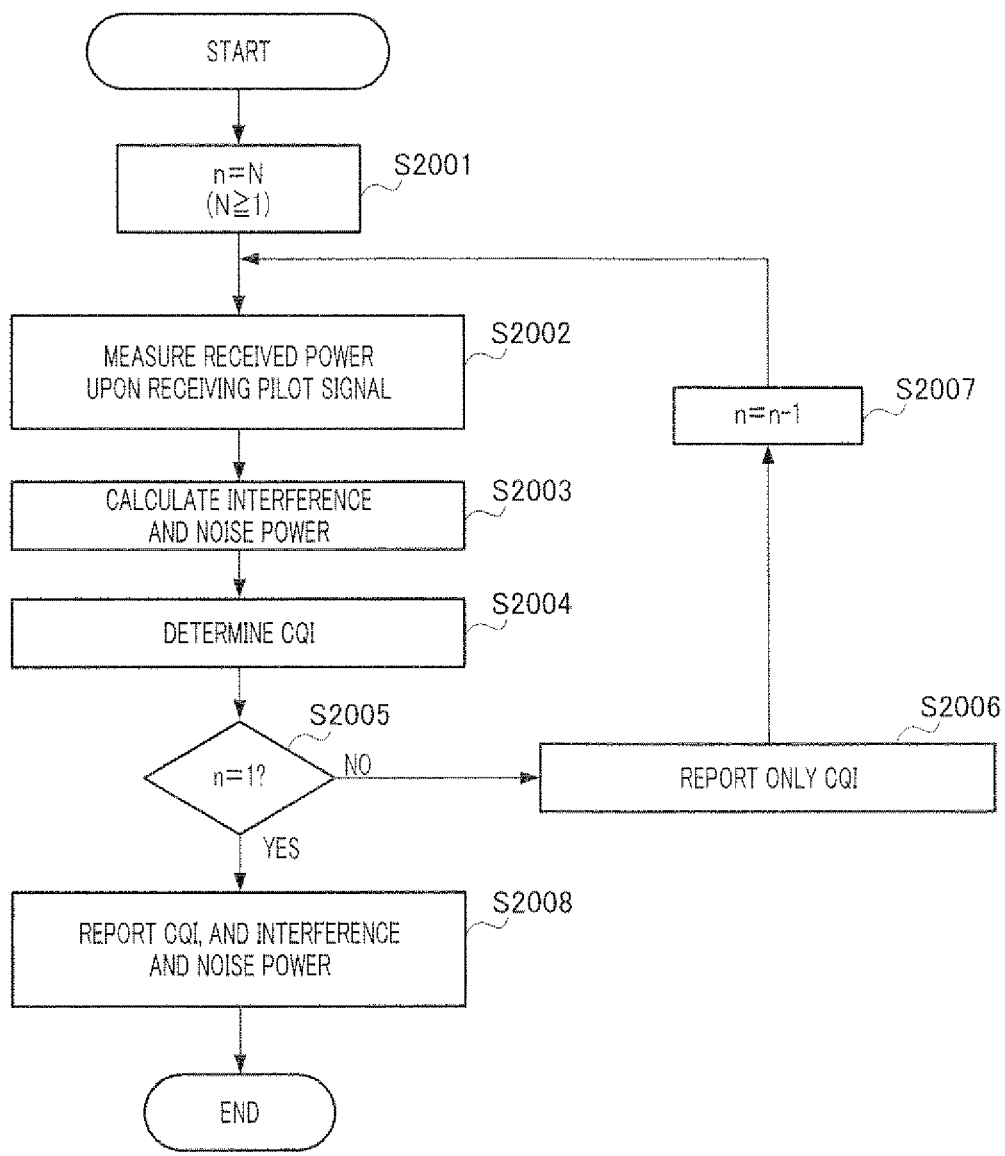
FIG. 14 is a flowchart showing another example of reporting processing performed by the mobile terminal apparatus in FIG. 10.

Next, a case will be described with reference to FIG. 14 where the present embodiment is applied to the wireless communication system of Embodiment 3. The processing in step 2002 to step S2004 in the flowchart of FIG. 14 corresponds to the processings in received pilot signal power measuring section 315, interference/noise power measuring section 320 and quality information generating section 525 described in Embodiment 3.

In step S2001, quality information generating section 525 initially sets the value of n to N (where N is a natural number of 1 or greater).

In step S2002, received pilot signal power measuring section 315 measures received power at the timing at which a quality measuring pilot signal of the received signal after the radio reception processing is received.

In step S2003, interference/noise power measuring section 320 calculates the interference and noise power components of the measured received power measured in received pilot signal power measuring section 315.

In step S2004, referring to the CQI table, quality information generating section 525 determines CQI matching the received power measured by received pilot signal power measuring section 315.

In step S2005, quality information generating section 525 decides whether or not the current value of n is 1.

When n is not 1, quality information generating section 525 decides that it is not the timing to report interference and noise power, and reports only CQI to radio base station apparatus 600 in step S2006.

In step S2007, quality information generating section 525 decrements the value of n. Then, the processing step returns to step S2002.

When n is decided to be 1 in step S2005, quality information generating section 525 decides that it is the timing to report interference and noise power, and reports the interference and noise power together with CQI, to radio base station apparatus 600 in step S2008.

Radio base station apparatus 600 performs downlink scheduling based on the reported CQI, and interference and noise power. However, the interference and noise power are reported only once every N times CQI is reported. Therefore, radio base station apparatus 600 performs downlink scheduling using the interference and noise power reported most recently. Thus, even if the frequency to report the interference and noise power is reduced, the variation in interference and noise power is less than the variation in CQI, and therefore there is no considerable influence on the accuracy of scheduling. By reducing the frequency to report interference and noise power, it is possible to reduce system traffic.

Furthermore, in the above description, interference and noise power is reported once every N times, but the present invention is not limited to this.

Furthermore, the value of N may be fixed in all mobile terminal apparatuses. Alternatively, the mobile terminal apparatus may also set the value of N according to an instruction from the radio base station apparatus.

Furthermore, the frequency to report interference and noise power may be varied. The reporting frequency may be varied based on the location of the mobile terminal apparatus. That is, in the vicinity of a cell/sector where interference and noise power fluctuates significantly, the frequency to report noise and interference power is increased, and in the vicinity of the center of the cell/sector where interference and noise power fluctuates less, the frequency to report noise and interference power is reduced. This is because interference from other cells is considered to increase from the center of the cell/sector toward the periphery of the cell/sector. In this case, quality information generating section 325 (and 525) inputs information about the location of the mobile terminal apparatus, and reports interference and noise power based on the reporting frequency matching this information.

Furthermore, the reporting frequency may be changed based on the level of fluctuation of interference and noise power. That is, when the fluctuation in the interference and noise power is significant because a degree of mobility of the mobile terminal apparatus is great or fluctuation in the distance from another cell is significant, the frequency to report interference and noise power is increased, and on the other hand, when the fluctuation in the interference and noise power is little because a degree of mobility of the mobile terminal apparatus is small or fluctuation in the distance from another cell is little, the frequency to report interference and noise power is decreased. In this case, interference/noise power measuring section 320 measures the magnitude of fluctuation of interference and noise power, and quality information generating section 325 (and 525) reports interference and noise power based on the reporting frequency matching the level of fluctuation of interference and noise power.

Embodiment 5

According to Embodiment 2 and Embodiment 3, each mobile terminal apparatus reports to the radio base station apparatus channel quality information (to be more specific, net channel quality with Embodiment 2 and CQI signal similar to that of the prior art with Embodiment 3), and downlink interference and noise power. By contrast, with the present embodiment, mobile terminal apparatuses are divided into a plurality of groups, and only some of mobile terminal apparatuses belonging to each group report downlink interference and noise power. By so doing, it is possible to reduce the overhead of reporting.

There can be various methods of grouping mobile terminal apparatuses.

<1> Grouping Method Based on the Location of a Mobile Terminal Apparatus

For example, groups are divided into a group of mobile terminal apparatuses located in the vicinity of the center of a cell, a group of mobile terminal apparatuses located in the vicinity of a cell edge and a group located in an area between both groups.

Furthermore, when, for example, a cell is divided into a plurality of sectors, groups are divided into a group located in the vicinity of a radio base station apparatus, a group located close to a sector boundary and a group located close to a boundary with another cell. Mobile terminal apparatuses are grouped in this way because, while the radio base station apparatus can control interference between mobile terminal apparatuses close to a sector boundary, the radio base station apparatus cannot control interference between mobile terminal apparatuses close to a boundary with another cell.

<2> Grouping Method Based on the Magnitude of Interference and Noise Power

For example, a radio base station apparatus makes all mobile terminal apparatuses report interference and noise power at least once. The radio base station apparatus performs grouping such that mobile terminal apparatuses having similar interference and noise power are grouped into the same group.

Furthermore, there can be various ways of determining a mobile terminal apparatus in each group that reports.

(1) A mobile terminal apparatus in a group is randomly selected.

(2) A mobile terminal apparatus having a great amount of remaining battery is selected.

(3) In an initial report, all mobile terminal apparatuses are made to report interference and noise power sequentially. In the second and subsequent reports, the mobile terminal apparatus having the most significant interference and noise power in each group is selected. Alternatively, in the second and subsequent reports, the mobile terminal apparatus having the least interference and noise power in each group may be selected. Alternatively, the mobile terminal apparatus having the most average interference and noise power may be selected.

Furthermore, the entity that selects a mobile terminal apparatus that reports may be the radio base station apparatus. Alternatively, mobile terminal apparatuses may collaborate to autonomously select a mobile terminal apparatus that reports.

Embodiment 6

According to Embodiment 2 and Embodiment 3, each mobile terminal apparatus reports to the radio base station apparatus channel quality information (to be more specific, net channel quality with Embodiment 2 and CQI signal similar to that in the prior art with Embodiment 3), and downlink interference and noise power. By contrast, according to the present embodiment, the mobile terminal apparatus decides whether or not to report downlink interference and noise power based on a predetermined threshold.

To be more specific, the radio base station apparatus reports a predetermined threshold to the mobile terminal apparatus first. Only a mobile terminal apparatus that exceeds the threshold reports downlink interference and noise power.

For example, the radio base station apparatus measures interference and noise power, and reports a power level X[dB] thereof and a predetermined threshold Y[dB]. When the interference and noise power measured in the mobile terminal apparatus exceeds X+Y[dB], the mobile terminal apparatus reports the downlink interference and noise power. Alternatively, only to what extent the mobile terminal apparatus exceeds X+Y[dB] may be reported instead of reporting the downlink interference and noise power themselves.

Furthermore, when the interference and noise power measured in the mobile terminal apparatus falls below X+Y[dB], the mobile terminal apparatus may be made to report downlink interference and noise power.

Furthermore, when the interference and noise power measured in the mobile terminal apparatus does not fall within a range between X−Y[dB] and X+Y[dB], the mobile terminal apparatus may be made to report downlink interference and noise power.

By the way, without reporting report X[dB] and Y[dB] from the radio base station apparatus, those values may be set in the mobile terminal apparatus beforehand.

The disclosure of Japanese Patent Application No. 2007-211541, filed on Aug. 14, 2007, including the specification, drawings and abstract is incorporated herein by reference in its entirety.

INDUSTRIAL APPLICABILITY

The wireless communication system, scheduling method, radio base station apparatus and radio terminal apparatus according to the present invention are suitable to improve system throughput.

The invention claimed is:

1. A scheduling method in an uplink in a wireless communication system to which a time division duplex scheme is applied to perform time division multiplexing on the uplink and a downlink, the scheduling method comprising:
measuring received power in the downlink;
measuring interference and noise power components in the downlink by calculating an average of a plurality of received signals and calculating a distribution of a difference between the average of the plurality of received signals and each of the plurality of received signals;
calculating net received power and information indicating the net received power by removing the downlink interference and noise power components from the downlink received power;
measuring interference and noise power components in the uplink; and
allocating an uplink band based on the information indicating the net received power and the information indicating the uplink interference and noise power components.

2. A radio base station apparatus in a wireless communication system to which a time division duplex scheme is applied to perform time division multiplexing on an uplink and a downlink, the radio base station apparatus comprising:
a processor including:
a receiver that receives information indicating received power in the downlink and information indicating interference and noise power components in the downlink;
a calculator that measures interference and noise power components in the uplink by calculating an average of a plurality of received signals and calculating a distribution of a difference between the average of the plurality of received signals and each of the plurality of received signals; and
a scheduler that calculates net received power removing the downlink interference and noise power components from the downlink received power, based on the information indicating the downlink received power and the information indicating the downlink interference and noise power components, and allocates uplink bands based on the net received power and the uplink interference and noise power components.

3. A radio base station apparatus in a wireless communication system to which a time division duplex scheme is applied to perform time division multiplexing on an uplink and a downlink, the radio base station apparatus comprising:
a processor including:
a receiver that receives information indicating net received power removing interference and noise power components in the downlink from received power in the downlink;
a calculator that measures interference and noise power components in the uplink by calculating an average of a plurality of received signals and calculating a distribution of a difference between the average of the plurality of received signals and each of the plurality of received signals; and
a scheduler that performs uplink band allocation based on the net received power and the uplink interference and noise power components.

4. A radio terminal apparatus in a wireless communication system to which a time division duplex scheme is applied to perform time division multiplexing on an uplink and a downlink, the radio terminal apparatus comprising:
a processor including:
an acquirer that acquires net received power removing interference and noise power from received power upon receiving a pilot signal transmitted in the downlink wherein the interference and noise power is determined by calculating an average of a plurality of received signals and calculating a distribution of a difference between the average of the plurality of received signals and each of the plurality of received signals;
a determiner that determines information indicating the net received power based on the acquired net received power; and
a transmitter that transmits the information indicating the net received power.

5. The radio terminal apparatus according to claim 4, further comprising a calculator that calculates the interference and noise power, wherein:

the transmitter transmits information indicating the interference and noise power at a transmission cycle longer than a transmission cycle of the information indicating the net received power.

6. The radio terminal apparatus according to claim 5, wherein the transmitter transmits information indicating the interference and noise power by making the transmission cycle longer when a current location of the radio terminal apparatus becomes closer to a cell edge from a center of a cell.

7. The radio terminal apparatus according to claim 4, further comprising a calculator that calculates the interference and noise power, wherein:
the transmitter transmits information indicating the interference and noise power only when the interference and noise power exceeds a predetermined level.

8. A radio terminal apparatus in a wireless communication system to which a time division duplex scheme is applied to perform time division multiplexing on an uplink and a downlink, the radio terminal apparatus comprising:
a processor including:
a received power measurer that measures received power upon receiving a pilot signal transmitted in the downlink;
a calculator that calculates interference and noise power in the downlink by calculating an average of a plurality of received signals and calculating a distribution of a difference between the average of the plurality of received signals and each of the plurality of received signals;
a received power determiner that determines information indicating the downlink received power based on the received power; and
a transmitter that transmits information indicating the received power and information indicating the downlink interference and noise power.

9. The radio terminal apparatus according to claim 8, wherein the transmitter transmits information indicating the downlink interference and noise power at a transmission cycle longer than a transmission cycle of the information indicating the received power.

10. The radio terminal apparatus according to claim 9, wherein the transmitter transmits the information indicating the downlink interference and noise power by making the transmission cycle longer when the current location of the radio terminal apparatus becomes closer to a cell edge from a center of a cell.

11. The radio terminal apparatus according to claim 9, further comprising a calculator that calculates the interference and noise power, wherein:
the transmitter transmits information indicating the interference and noise power only when the interference and noise power exceeds a predetermined level.

12. A wireless communication system to which a time division duplex scheme is applied to perform time division multiplexing on an uplink and a downlink, the wireless communication system comprising:
a plurality of radio terminal apparatuses that each comprise:
a processor including:
an acquirer that acquires net received power removing interference and noise power from received power upon receiving a pilot signal transmitted in the downlink;
a determiner that determines information indicating the net received power based on the acquired net received power;
a calculator that calculates the interference and noise power by calculating an average of a plurality of received signals and calculating a distribution of a difference between the average of the plurality of received signals and each of the plurality of received signals; and
a transmitter that transmits the information indicating the net received power and information indicating the interference and noise power, to a radio base station apparatus,
wherein some radio terminal apparatuses belonging to each of groups into which the plurality of radio terminal apparatuses are grouped transmit only information indicating the net received power at each transmission timing.

13. A wireless communication system to which a time division duplex scheme is applied to perform time division multiplexing on an uplink and a downlink, the wireless communication system comprising:
a plurality of radio terminal apparatuses that each comprise:
a processor including:
a received power measurer that measures received power upon receiving a pilot signal transmitted in the downlink;
a calculator that calculates interference and noise power in the downlink by calculating an average of a plurality of received signals and calculating a distribution of a difference between the average of the plurality of received signals and each of the plurality of received signals;
a received power determiner that determines information indicating the received power in the downlink based on the received power; and
a transmitter that transmits information indicating the received power and information indicating the downlink interference and noise power to a radio base station apparatus,
wherein some radio terminal apparatuses belonging to each of groups into which the plurality of radio terminal apparatuses are grouped transmit only information indicating the received power at each transmission timing.

* * * * *